United States Patent [19]
Cabeza

[11] 3,741,503
[45] June 26, 1973

[54] AIRCRAFT LANDING GEAR

[76] Inventor: Henry Cabeza, 2090 Cambridge Road, T.M.R., Montreal, Quebec, Canada

[22] Filed: Apr. 10, 1972

[21] Appl. No.: 242,521

[52] U.S. Cl............................................. 244/103 S
[51] Int. Cl............................................. B64c 25/40
[58] Field of Search.................... 244/103 S, 103 R, 244/100 R

[56] References Cited
UNITED STATES PATENTS
2,386,301 10/1945 Duke et al...................... 244/103 S
2,414,849 1/1947 Beazley.......................... 244/103 S
2,468,790 5/1949 Suiter............................. 244/103 S Primary Examiner—Milton Buchler
Assistant Examiner—Paul E. Sauberer
Attorney—Raymond A. Robic

[57] ABSTRACT

Means for rotating an aircraft wheel wherein the tire of the wheel is formed with several peripheral vanes distributed in two adjacent coaxial circular rows and wherein a nozzle directs a jet of air on the vanes. The vanes of one of the two rows are arranged in the space between two successive vanes of the adjacent row. The nozzle has a fluid outlet sufficiently wide to cover both rows.

7 Claims, 5 Drawing Figures

PATENTED JUN 26 1973 3,741,503
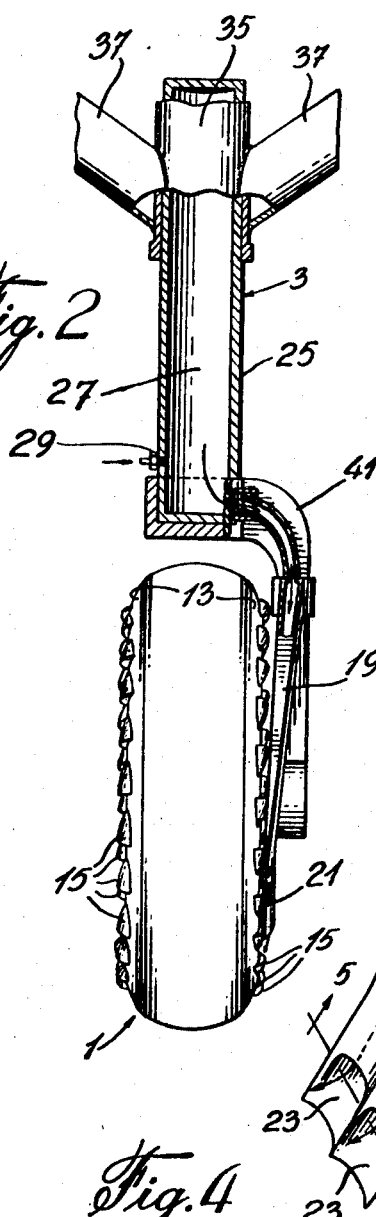
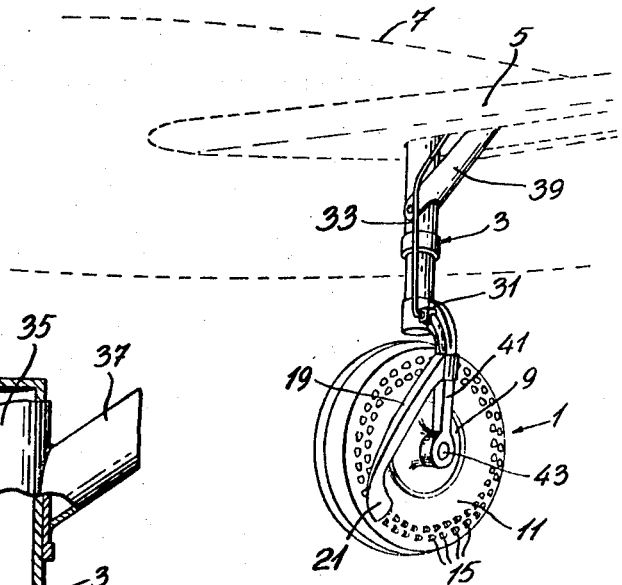
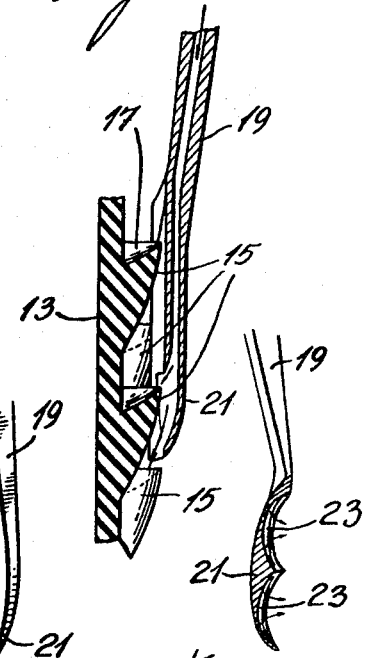
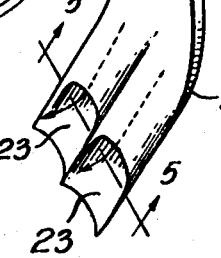

AIRCRAFT LANDING GEAR

The present invention relates to an aircraft landing gear and more specifically to means for causing rotation of the wheels prior to landing.

It is well known that, because of the tremendous friction developing in the pneumatic tires upon landing of the aircraft as a result of the tires contacting the ground with no speed while the aircraft moves at the required relatively high landing speed, useful and safe service life of the tires is extremely short.

Various efforts have been made in the past to overcome this detrimental condition by means of arrangements causing the wheels to rotate prior to their contacting the ground whereby to lessen the braking effect of non-rotating wheels. However, these arrangements have not proven satisfactory for a number of reasons which the present invention purports to avoid.

With the above difficulties in mind, the main object of the invention lies in the provision of means to cause rotation of the wheels of an aircraft, prior to landing, that will substantially reduce the wear and tear as well as the danger of blowing out the pneumatic tires.

Another object of the invention resides in the provision of such means by which the acceleration is more rapid and smoother whereby landing is accomplished with correspondingly lower stresses being induced in the landing gear and fuselage resulting in reduced landing impact and thus in longer life to the parts having to absorb the said landing impact.

The above-mentioned objects can be attained in an aircraft landing gear having a wheel supporting structure with a wheel rotatably mounted at one of its ends, the wheel having a pneumatic tire with sidewalls of which at least one is formed with a plurality of vanes. The supporting structure further includes a gas nozzle having an outlet disposed to direct a gas jet on the vanes to cause rotation of the wheel. The landing gear is characterized in that it is provided with a hollowed out member forming part of the supporting structure and defining a pressure gas chamber, the gas nozzle being connected to this pressure chamber to supply the nozzle with pressure gas.

A better understanding of the invention will now be had by the description that follows of a preferred embodiment having reference to the appended drawings wherein:

FIG. 1 is a perspective view of a landing gear of an aircraft, portion of which is shown in phantom lines;

FIG. 2 is a front elevation view, partly shown in cross-section, of the landing gear with the means for rotating the wheel prior to landing;

FIG. 3 is a vertical cross-sectional view of the lower end of the blowing nozzle and a portion of one of the pneumatic tire side walls;

FIG. 4 is a perspective view of the lower end of the blowing nozzle;

FIG. 5 is a transverse cross-sectional view taken along line 5—5 of FIG. 4.

As shown in FIGS. 1 and 2, the wheel 1 is shown mounted on a conventional landing gear assembly 3 fixed beneath a wing 5 of an aircraft 7.

Wheel 1 has a central hub 9 to the peripheral rim of which is mounted a pneumatic tire 11 having the usual side walls 13.

A plurality of vanes 15 are provided on the side walls 13, preferably formed integral with the tire 11 and projecting laterally away from the side walls 13. As best shown in FIG. 3, each vane 15 has a concave face 17, all concave faces pointing in the same direction which is opposite the direction of rotation of wheel 1.

A fluid nozzle 19 having a fluid outlet 21 directs a fluid jet, preferably air, on the vanes 15 to cause rotation of the wheel 1. As best illustrated in FIG. 1, the fluid outlet 21 curves from the main body of the nozzle 19 so as to direct the fluid jet squarely on the concave faces 17 of the vanes 15. In the preferred embodiment of the invention, vanes 15 are arranged in two coaxial circular adjacent rows, as best illustrated in FIG. 1, and the fluid outlet 21 has a width sufficiently great simultaneously to supply both the rows of vanes. This is also clearly illustrated in FIG. 1.

It will also be noted that the vanes of one row are arranged in the space between two successive vanes of the adjacent row so that the air thrust on the pneumatic tire 11 may be more continuous resulting in a more uniform rotating speed of wheel 11.

Preferably, and as shown in FIG. 4, the outlet 21 may be divided up into air mouths 23 each corresponding to one of the adjacent rows of vanes 15.

The landing gear or supporting structure 3 preferably includes a hollowed out member 25 defining a fluid pressure chamber 27 acting as a reservoir for air under pressure. Air may be pumped into chamber 27 after each landing through the inlet valve 29 or else chamber 27 may be connected to a compressed air reservoir in the aircraft.

Chamber 27 is operatively connected to nozzle 19 through an air outlet valve 31, preferably solenoid operated. A control line 33 connects valve 31 to the instrument board of the aircraft for control by the pilot. To assist the pilot in assessing the speed of the wheels 11, a conventional speedometer (not shown) may be connected to the wheel with a reading meter on the instrument board of the plane.

In a preferred form of the invention, the landing gear or supporting structure 3 for each wheel 11 may be a shock absorbing assembly as shown in FIGS. 1 and 2 wherein the previously mentioned hollowed out member 25 would be a piston slidable in a hydraulic cylinder 35 fixed to braces 37 in turn secured to the fuselage as shown in FIG. 2 or pivotally mounted on an arm 39 connected to the wing of the aircraft if the landing gear is meant to be retractable.

In either case, a strut 41 is fixed at the upper end to the lower end of the hollowed out member 25, the wheel 1 being mounted for rotation at the lower end of the said strut 41 through a stub shaft 43 of the hub 9. Nozzle 19 is secured to the said strut 41 intermediate the ends thereof.

Although the preferred embodiment of the invention shows the provision of a hollowed out member 25 defining an air pressure chamber 27 for supplying the air nozzle 19, it will be understood that nozzle 19 may be connected directly to a reservoir of air under pressure located inside the plane.

Also, the air in the reservoir in the plane or in the air chamber 27 may be used to cool the brakes after the aircraft has landed.

I claim:

1. An aircraft landing gear including a wheel supporting structure with a wheel rotatably mounted at one end thereof, said wheel having a pneumatic tire with sidewalls of which at least one sidewall is formed with a plurality of vanes, said supporting structure further including a gas nozzle having an outlet disposed to direct a gas jet on said vanes to cause rotation of said wheel, the said landing gear being characterized by the combination therewith comprising:
- a hollowed out member, as part of said supporting structure, said member defining a pressure gas chamber, and
- means operatively connecting said gas nozzle to said chamber to supply said nozzle with pressure gas.

2. The combination as claimed in claim 1, wherein said vanes are arranged in two coaxial circular adjacent rows and said nozzle outlet has a width sufficiently great simultaneously to supply both said rows.

3. The combination as claimed in claim 2, wherein the vanes of one row are arranged in the space between two successive vanes of the adjacent row.

4. The combination as claimed in claim 3, including a control valve on said nozzle to control gas admission to said outlet.

5. The combination as claimed in claim 1, wherein said supporting structure further includes a strut fixed at the upper end to the lower end of said hollowed out member, said wheel being mounted for rotation at the lower end of said strut and said nozzle being secured to said strut.

6. The combination as claimed in claim 5, wherein said supporting structure is a hydraulic shock absorbing assembly of which said hollowed out member is a component.

7. The combination as claimed in claim 5, wherein said supporting structure is a hydraulic shock absorber of which said hollowed out member is the piston of said absorber.

* * * * *